(12) United States Patent
Shin et al.

(10) Patent No.: US 9,628,765 B2
(45) Date of Patent: Apr. 18, 2017

(54) SPATIAL IMAGE PROJECTION APPARATUS

(71) Applicants: LG ELECTRONICS INC., Seoul (KR); KWANGWOON UNIVERSITY INDUSTRY-ACADEMIC COLLABORATION FOUNDATION, Seoul (KR)

(72) Inventors: Sungchul Shin, Seoul (KR); Eunsoo Kim, Seoul (KR); Seungcheol Kim, Seoul (KR)

(73) Assignees: LG ELECTRONICS INC., Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 0 days.

(21) Appl. No.: 14/876,486

(22) Filed: Oct. 6, 2015

(65) Prior Publication Data
US 2016/0100142 A1    Apr. 7, 2016

(30) Foreign Application Priority Data
Oct. 6, 2014    (KR) .................. 10-2014-0134179

(51) Int. Cl.
*H04N 13/04*    (2006.01)
*G02B 27/22*    (2006.01)
(Continued)

(52) U.S. Cl.
CPC ....... *H04N 9/3167* (2013.01); *G02B 27/2214* (2013.01); *G02B 27/26* (2013.01);
(Continued)

(58) Field of Classification Search
CPC ............... H04N 9/3185; H04N 9/3167; H04N 13/0459; G02B 27/22
See application file for complete search history.

(56) References Cited

U.S. PATENT DOCUMENTS 9,279,992 B2 *   3/2016   Shin .................. G02B 27/2285
2008/0259012 A1 *  10/2008  Fergason ............ G02B 27/017
                                                            345/89

(Continued)

FOREIGN PATENT DOCUMENTS

JP         2012-508392 A     4/2012
KR      10-2006-0134066 A    12/2006
KR      10-2014-0089226 A    7/2014

*Primary Examiner* — Brian Yenke
*Assistant Examiner* — Sean Haiem
(74) *Attorney, Agent, or Firm* — Birch, Stewart, Kolasch & Birch, LLP (57) ABSTRACT

A spatial image projection apparatus including a receiver configured to receive an image signal; a display unit configured to display an image acquired by processing the image signal; a projection unit configured to project a spatial image to a prescribed space by transmitting or reflecting light corresponding to the image displayed on the display unit; and an optical-path length-converter located between the display unit and the projection unit so as to change an optical-path length of the image. Further, the optical-path length-converter includes a polarizer configured to transmit only specific polarized light, among the light introduced from the display unit, toward the projection unit, and to reflect the remaining light other than the specific polarized light; and a mirror configured to transmit light, introduced from the display unit, to the polarizer, and to convert the light reflected from the polarizer into specific polarized light so as to again reflect the light to the polarizer.

19 Claims, 9 Drawing Sheets

(51) Int. Cl.
  *G02B 27/26*   (2006.01)
  *H04N 9/31*   (2006.01)
  *G02B 13/14*   (2006.01)
  *G02B 26/08*   (2006.01)

(52) U.S. Cl.
  CPC ....... *H04N 13/047* (2013.01); *H04N 13/0493* (2013.01); *G02B 13/14* (2013.01); *G02B 26/0875* (2013.01)

(56) References Cited

U.S. PATENT DOCUMENTS

| | | | | |
|---|---|---|---|---|
| 2011/0109820 A1* | 5/2011 | Silverstein | ......... | G02B 27/1053 349/8 |
| 2011/0193814 A1* | 8/2011 | Gay | ................ | G02B 27/2221 345/173 |
| 2011/0234928 A1* | 9/2011 | Masuda | ................ | G03B 33/12 349/8 |
| 2011/0267687 A1* | 11/2011 | Kim | ................ | G02B 17/08 359/364 |
| 2013/0215393 A1* | 8/2013 | Kim | ................ | G02B 27/2292 353/10 |
| 2016/0100138 A1* | 4/2016 | Shin | ................ | H04N 13/0459 348/51 |

* cited by examiner

SPATIAL IMAGE PROJECTION APPARATUS

Pursuant to 35 U.S.C. §119(a), this application claims the benefit of Korean Patent Application No. 10-2014-0134179, filed on, Oct. 6, 2014, which is hereby incorporated by reference as if fully set forth herein.

BACKGROUND OF THE INVENTION

Field of the Invention

The present invention relates to a spatial image projection apparatus, and more particularly to a spatial image projection apparatus which projects a spatial image in a space via a projection unit.

Discussion of the Related Art

In general, a spatial image expresses depth, unlike a two-dimensional (2D) planar image. Here, when both eyes of a person perceive a spatial image, the person can experience a three-dimensional (3D) feeling. In addition, a spatial image projection apparatus is configured to project a spatial image, thus making a person experience a 3D feeling as though the person were viewing an actual scene.

Although 3D display technologies using, for example, polarization, shutter glass, parallax barrier, and lenticular methods have been applied for spatial image projection, these methods require that special glasses be worn in order to view a stereoscopic image, and suffer from a limited view angle when no glasses are used.

In addition, another method for spatial image projection is a volumetric method using a rotating screen. Although the volumetric method enables a person to view a 3D image in all directions, the person cannot touch the image because the image is present on a screen. Another method is a spatial projection display method using a concave mirror or a convex lens.

Figure 1:
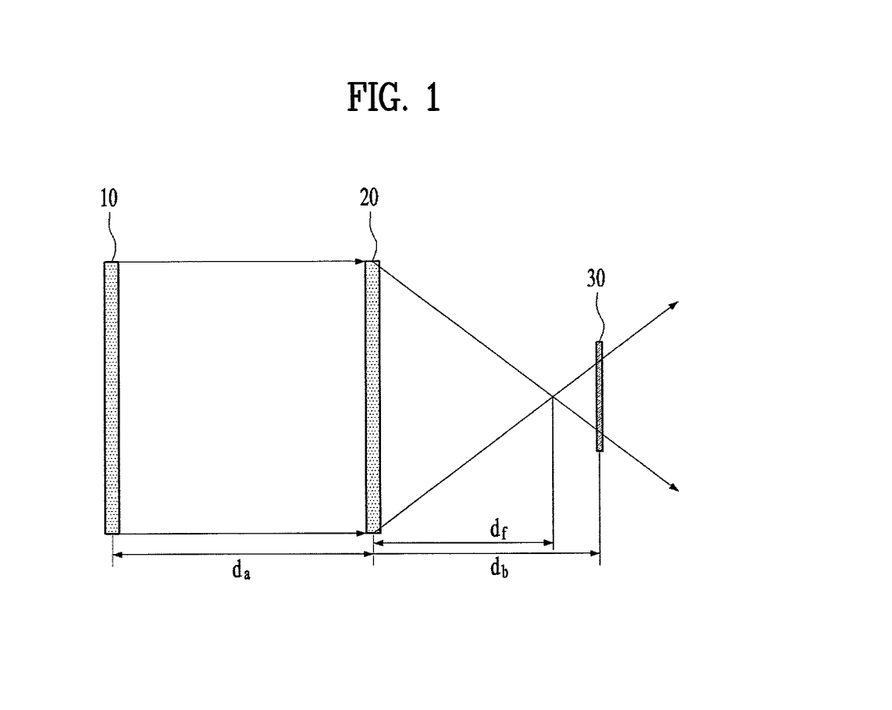
FIG. 1 is a view illustrating a general spatial image projection apparatus using a convex lens.

In more detail, FIG. 1 is a view illustrating a general spatial image projection apparatus using a convex lens. As illustrated in FIG. 1, the related art spatial image projection apparatus includes a display panel 10 which displays an image and a convex lens 20 which is spaced apart from the display panel 10 by a given distance and serves to project an image, which has been displayed on the display panel 10, onto a prescribed space.

Here, a spatial image 30 in the prescribed space is produced at a position forwardly spaced apart from the convex lens 20 by a given distance. In order to produce the spatial image 30 in the prescribed space as described above, a given space is required between the display panel 10 and the convex lens 20. That is, when the distance between the display panel 10 and the convex lens 20 is "da", the focal distance of the convex lens 20 is "df", and the distance between the convex lens 20 and the spatial image 30 is "db", the relationship of 1/db=1/df−1/da is established.

Accordingly, because of the necessity for the given space between the display panel 10 and the convex lens 20 in order to produce the spatial image 30 in front of the convex lens 20, the related art spatial image projection apparatus inevitably requires a very bulky configuration and is of limited usefulness in various fields. In addition, the size of the spatial image 30 is smaller than an image displayed on the display panel 10 because the image on the display panel 10 is projected in front of the convex lens 20 by way of the convex lens 20.

SUMMARY OF THE INVENTION

Accordingly, one aspect of the present invention is to provide a spatial image projection apparatus that substantially obviate one or more problems due to limitations and disadvantages of the related art.

Another object of the present invention is to provide a spatial image projection apparatus in which an optical-path length-converter is located between a display unit and a projection unit, which maintains a spatial image that is the same size as an image displayed on the display unit despite a reduction in the thickness of the entire apparatus.

To achieve these objects and other advantages and in accordance with the purpose of the invention, as embodied and broadly described herein, in accordance with an aspect, the present invention provides a spatial image projection apparatus including a receiver configured to receive an image signal; a display unit configured to display an image acquired by processing the image signal; a projection unit configured to project a spatial image to a prescribed space by transmitting or reflecting light corresponding to the image displayed on the display unit; and an optical-path length-converter located between the display unit and the projection unit so as to change an optical-path length of the image. Further, the optical-path length-converter includes a polarizer configured to transmit only specific polarized light, among the light introduced from the display unit, toward the projection unit, and to reflect the remaining light other than the specific polarized light; and a mirror configured to transmit light, introduced from the display unit, to the polarizer, and to convert the light reflected from the polarizer into specific polarized light so as to again reflect the light to the polarizer.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE INVENTION

Hereinafter, the present invention will be described in more detail with reference to the accompanying drawings. A suffix such as "module" and "unit" may be used to refer to elements or components that will be described below. Use of such a suffix herein is merely intended to facilitate description of the specification, and the suffix "module" and "unit" may be mingled with each other.

In addition, although embodiments of the present invention will be described in detail with reference to the accompanying drawings and descriptions of the accompanying drawings, the present invention is not limited or restricted by the embodiments of the present invention. Although the terms used in the following description are selected, as much as possible, from general terms that are widely used at present while taking into consideration the functions obtained in accordance with the present invention, these terms may be replaced by other terms based on intensions of those skilled in the art, customs, emergence of new technologies, or the like. Also, in a particular case, terms that are arbitrarily selected by the applicant of the present invention may be used. In this instance, the meanings of these terms may be described in corresponding description parts of the invention. Accordingly, it should be noted that the terms used herein should be construed based on practical meanings thereof and the whole content of this specification, rather than being simply construed based on names of the terms.

A spatial image projection apparatus described in this specification may be included in, for example, a mobile phone, a smart phone, a laptop computer, a digital broadcast terminal, a personal digital assistant (PDA), a portable multimedia player (PMP), and a navigation system. However, it will be easily appreciated by those skilled in the art that the configuration of the spatial image projection apparatus according to the embodiments described in this specification may be applied to fixed terminals such as, for example, a mobile terminal, a digital TV, and a desktop computer.

Figure 2:
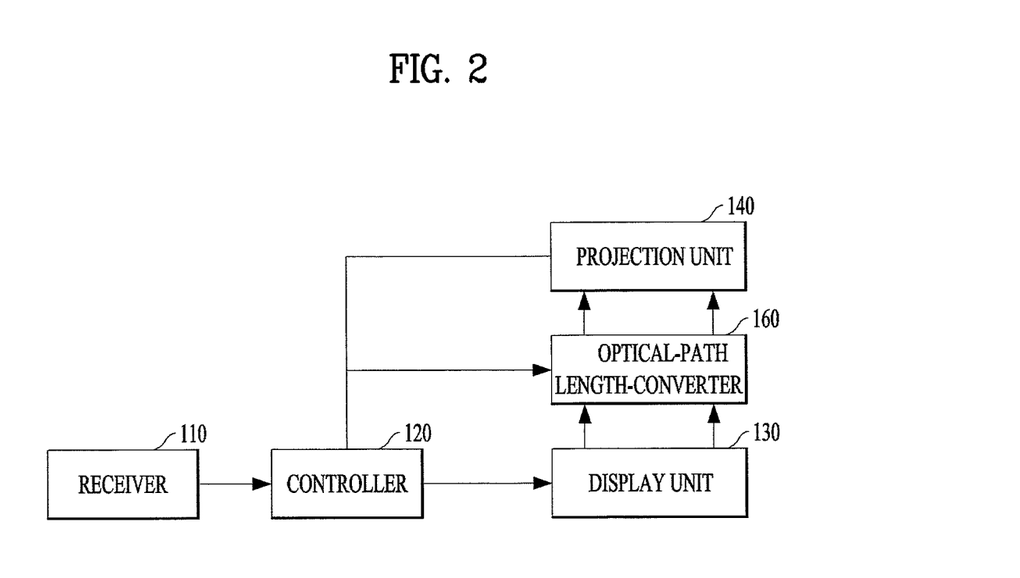
FIG. 2 is a block diagram illustrating a spatial image projection apparatus according to one embodiment of the present invention.

FIG. 2 is a block diagram illustrating a spatial image projection apparatus according to one embodiment of the present invention. As illustrated in FIG. 2, the spatial image projection apparatus includes a receiver 110, a controller 120, a display unit 130, a projection unit 140, and an optical-path length-converter 160.

The receiver 110 receives an image signal from an external device. In addition, the external device includes a storage medium in which images are stored. The receiver 110 may additionally receive a projection position signal from the external device. In particular, the projection position signal is a signal that determines the position of a spatial image which is produced by projecting an image to a prescribed space.

The projection position signal may also be a signal that controls a motor used to move at least one of the display unit 130 and the projection unit 140, may be a signal that changes the state of the projection unit 140 that has a liquid crystal lens or a liquid lens, or may be a signal that controls a shutter included in the projection unit 140. In addition, the projection position signal may be a signal that controls a drive unit used to move at least one of a mirror and a polarizer of the optical-path length-converter 160.

Further, the controller 120 processes the image signal and transmits the processed image signal to the display unit 130, thereby controlling the display unit 130 so as to display an image. In addition, the controller 120 controls the operation of a motor included in the display unit 130 and/or the projection unit 140 and the operation of the projection unit 140 in response to the projection position signal.

In some instances, the controller 120 can control the drive unit which moves at least one of the mirror and the polarizer of the optical-path length-converter 160. Further, the display unit 130 can display a spatial image to be projected to a prescribed space. In addition, the display unit 130 may be, for example, a general plane display unit, a volumetric 3D display unit using a rotating screen, a stacked 3D display unit, an integrated image based 3D display unit, or a hologram based 3D display unit.

In addition, the display unit 130 may include a prescribed polarizing plate so as to polarize and emit light in a given direction when the display unit 130 emits light corresponding to the image. For example, when an image is displayed on the display unit 130, the image has the characteristics of light polarized in a given direction. The polarization characteristics of the image in a given direction may be accomplished by an LCD panel, or by adding a polarizing plate to non-polarized light from, for example, OLEDs.

Then, the projection unit 140 projects a spatial image to a prescribed space by transmitting or reflecting the light corresponding to the image displayed on the display unit 130. The projection unit 140 may include a single convex lens, or may include an array including a plurality of convex lenses. In addition, the projection unit 140 may include at least one liquid crystal lens or liquid lens.

In some instances, the projection unit 140 may include a plurality of lenses. In one example, the projection unit 140 includes a first lens which transmits light introduced from the optical-path length-converter 160 so as to project a first spatial image to a first space, and a second lens which is spaced apart from the first lens by a given distance and reflects the light directed from the first lens so as to project a second spatial image to a second space.

The first lens may be a floating lens, and the second lens may be a floor lens. In this instance, the first spatial image and the second spatial image can be symmetrically formed. Next, the optical-path length-converter 160 is located between the display unit 130 and the projection unit 140, and serves to change the length of the optical-path of an image.

Further, the optical-path length-converter 160 may include a polarizer and a mirror. Also, the polarizer can transmit only specific polarized light, among the light from the display unit 130, to the projection unit 140, and reflect the remaining light other than the specific polarized light.

In addition, the mirror can transmit light introduced from the display unit 130 to the polarizer, and convert light reflected from the polarizer into specific polarized light so as to again reflect the light to the polarizer. The polarizer may include a reflective polarizing plate configured to transmit linearly polarized light, and the mirror may include a one-way mirror that transmits light only in a given direction.

In addition, the optical-path length-converter 160 may further include first and second wavelength plates. The first wavelength plate may be located between the display unit 130 and the mirror, and the second wavelength plate may be located between the mirror and the polarizer. In addition, the first and second wavelength plates may be the same wavelength plate, and for example, may be a ¼λ wavelength plate.

In some instances, the first and second wavelength plates may be different wavelength plates depending on the specific polarized light that has passed through the polarizer. In addition, the optical-path length-converter 160 can change the length of the optical path from the display unit 130 to the projection unit 140 to the sum of a first optical-path length from the display unit 130 to the polarizer, a second optical-path length from the polarizer to the mirror, and a third optical-path length from the mirror to the projection unit 140.

The first optical-path length can be the distance between the light emission surface of the display unit 130 and the light reflection surface of the polarizer, the second optical-path length can be the distance between the light reflection surface of the polarizer and the light reflection surface of the mirror, and the third optical-path length can be the distance between the light reflection surface of the mirror and the light introduction surface of the projection unit 140.

In addition, the sum of the first, second, and third optical-path lengths can be changed according to the distance between the display unit 130 and the projection unit 140. In one example, the sum of the first, second, and third optical-path lengths increases as the distance between the display unit 130 and the projection unit 140 decreases, and decreases as the distance between the display unit 130 and the projection unit 140 increases.

In some instances, the optical-path length-converter 160 can change the length of the optical path by linearly moving at least one of the mirror and the polarizer toward the display unit 130 or the projection unit 140 in response to a control signal from the controller 120. In this way, according to an embodiment of the present invention, by locating the optical-path length-converter 160 between the display unit 130 and the projection unit 140, the distance between the display unit 130 and the projection unit 140 can be reduced, which enables a reduction in the thickness of the entire apparatus and ensures that the size of the spatial image is maintained. In addition, the spatial image projection apparatus of the present invention achieves a minimum depth thereof, which enables a reduction in the size of a mechanism capable of forming a spatial image.

Figure 3:
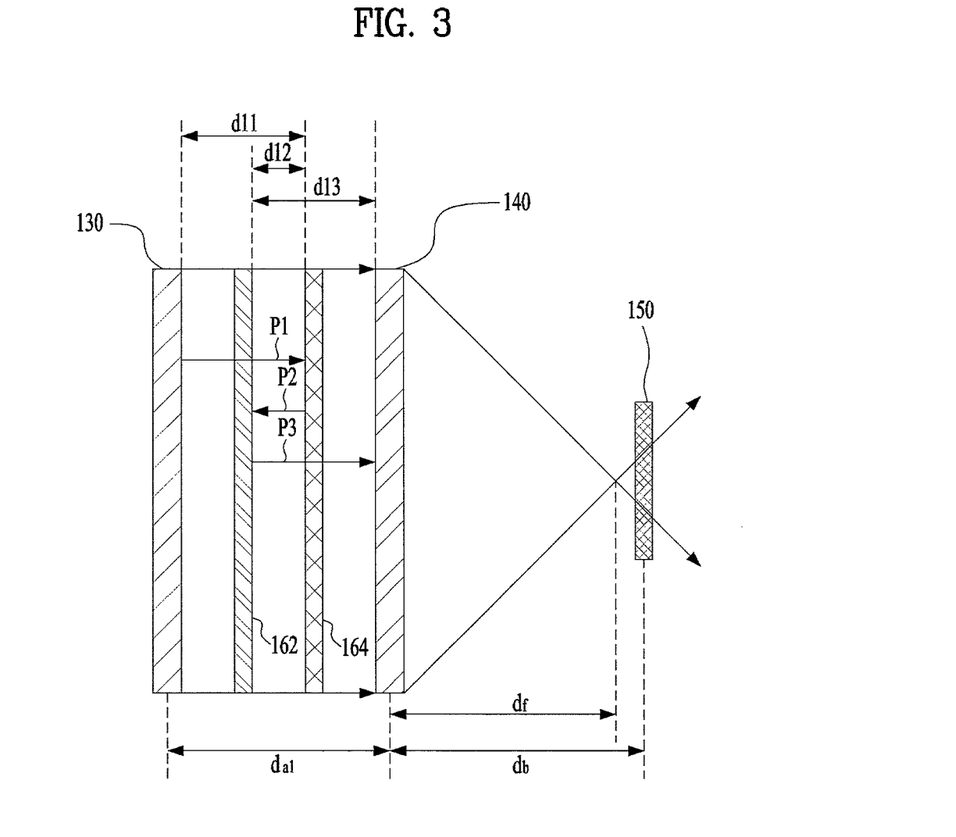
FIG. 3 is a sectional view schematically illustrating a spatial image projection apparatus according to one embodiment of the present invention.

Next, FIG. 3 is a sectional view schematically illustrating the spatial image projection apparatus according to one embodiment of the present invention. As illustrated in FIG. 3, in the spatial image projection apparatus, the display unit 130 and the projection unit 140 are spaced apart from each other by a given distance, and the optical-path length-converter 160 (see FIG. 2) is located between the display unit 130 and the projection unit 140.

As shown in FIG. 3, the optical-path length-converter 160 includes a mirror 162 and a polarizer 164, in order to change the length of the optical path of an image. In particular, the polarizer 164 of the optical-path length-converter 160 transmits specific polarized light, among the light from the display unit 130, to the projection unit 140, and reflects the remaining light, other than the specific polarized light, to the mirror 162. In addition, the polarizer 164 may include a reflective polarizing plate that transmits only linearly polarized light, without being limited thereto. In addition, the mirror 162 can transmit light, introduced from the display unit 130, to the polarizer 164, and convert light reflected from the polarizer 164 into specific polarized light so as to again reflect the light to the polarizer 164.

In addition, the mirror 162 may include a one-way mirror that transmits light only in a given direction, without being limited thereto. In some instances, the mirror 162 may further include at least one wavelength plate to convert specific polarized light reflected from the polarizer 164. Further, the polarizer 164 and the mirror 162 are spaced apart from each other by a given distance.

In addition, the polarizer 164 is spaced apart from the display unit 130 by a first distance, and the mirror 162 is spaced apart from the display unit 130 by a second distance. The first distance may be longer than the second distance. That is, the mirror 162 may be located adjacent to the display unit 130, and the polarizer 164 may be located adjacent to the projection unit 140.

In addition, the area of the polarizer 164 and the area of the mirror 162 may be the same. This serves to prevent the loss of light directed from the mirror 162 to the polarizer 164 and the loss of light directed from the polarizer 164 to the mirror 162. However, in some instances, the area of the polarizer 164 and the area of the mirror 162 may be different.

In one example, the area of the polarizer 164 is smaller than the area of the mirror 162. This serves to prevent the loss of light reflected from the polarizer 164, which occurs when the area of the polarizer 164 is larger than the area of the mirror 162. In addition, the area of at least one of the polarizer 164 and the mirror 162 may be the same as the area of the display unit 130 and may be the same as the area of the projection unit 140.

In one example, all of the polarizer 164, the mirror 162, the display unit 130, and the projection unit 140 have the same area. However, the area of at least one of the polarizer 164 and the mirror 162 may be different from the area of the display unit 130 or the area of the projection unit 140. In one example, the area of at least one of the polarizer 164 and the mirror 162 are larger than the area of the display unit 130 or the area of the projection unit 140.

This serves to prevent the loss of light emitted from the display unit 130, which occurs when the area of the display unit 130 or the area of the projection unit 140 is larger than the area of the polarizer 164 and the area of the mirror 162. In addition, the optical-path length-converter 160 can change the length of the optical path from the display unit 130 to the projection unit 140 to the sum of a first optical-path length P1 from the display unit 130 to the polarizer 164, a second optical-path length P2 from the polarizer 164 to the mirror 162, and a third optical-path length P3 from the mirror 162 to the projection unit 140.

The first optical-path length P1 is the distance d11 between the light emission surface of the display unit 130 and the light reflection surface of the polarizer 164, the second optical-path length P2 is the distance d12 between the light reflection surface of the polarizer 164 and the light reflection surface of the mirror 162, and the third optical-path length P3 is the distance "d13" between the light reflection surface of the mirror 162 and the light introduction surface of the projection unit 140.

Accordingly, the sum of the first, second, and third optical-path lengths P1+P2+P3 can be changed according to the distance da1 between the display unit 130 and the projection unit 140. In one example, the sum of the first, second, and third optical-path lengths P1+P2+P3 increases as the distance da1 between the display unit 130 and the projection unit 140 decreases, and decreases as the distance da1 between the display unit 130 and the projection unit 140 increases.

That is, when the distance between the display unit 130 and the projection unit 140 is "da1", the focal distance of the projection unit 140 is "df", and the distance between the projection unit 140 and a spatial image 150 is "db", the relationship of 1/db=1/df−1/da is established. Accordingly, assuming that the sum of the first, second, and third optical-path lengths P1+P2+P3 is the same as the distance da1 between the display unit 130 and the projection unit 140, the relationship of P1+P2+P3=da1 can be established.

When the distance "da1" between the display unit 130 and the projection unit 140 is reduced, the optical-path length-converter 160 can adjust the sum of the first, second, and third optical-path lengths P1+P2+P3 such that the distance "da1" between the display unit 130 and the projection unit 140 is maintained at the same value as that before the reduction of the distance "da1", which ensures that the size of the spatial image 150 is maintained.

In this way, even if the distance "da1" between the display unit 130 and the projection unit 140 is reduced, the optical-path length-converter 160 can maintain the distance "da1" between the display unit 130 and the projection unit 140 at the same value as that before the reduction of the distance "da1" by adjusting the first, second, and third optical-path lengths, thereby enabling the size of the spatial image 150 to be maintained. Accordingly, in the present embodiment, the size of the spatial image projection apparatus can be reduced because the size of the spatial image may be maintained despite a reduction in the thickness of the apparatus.

Figure 4:
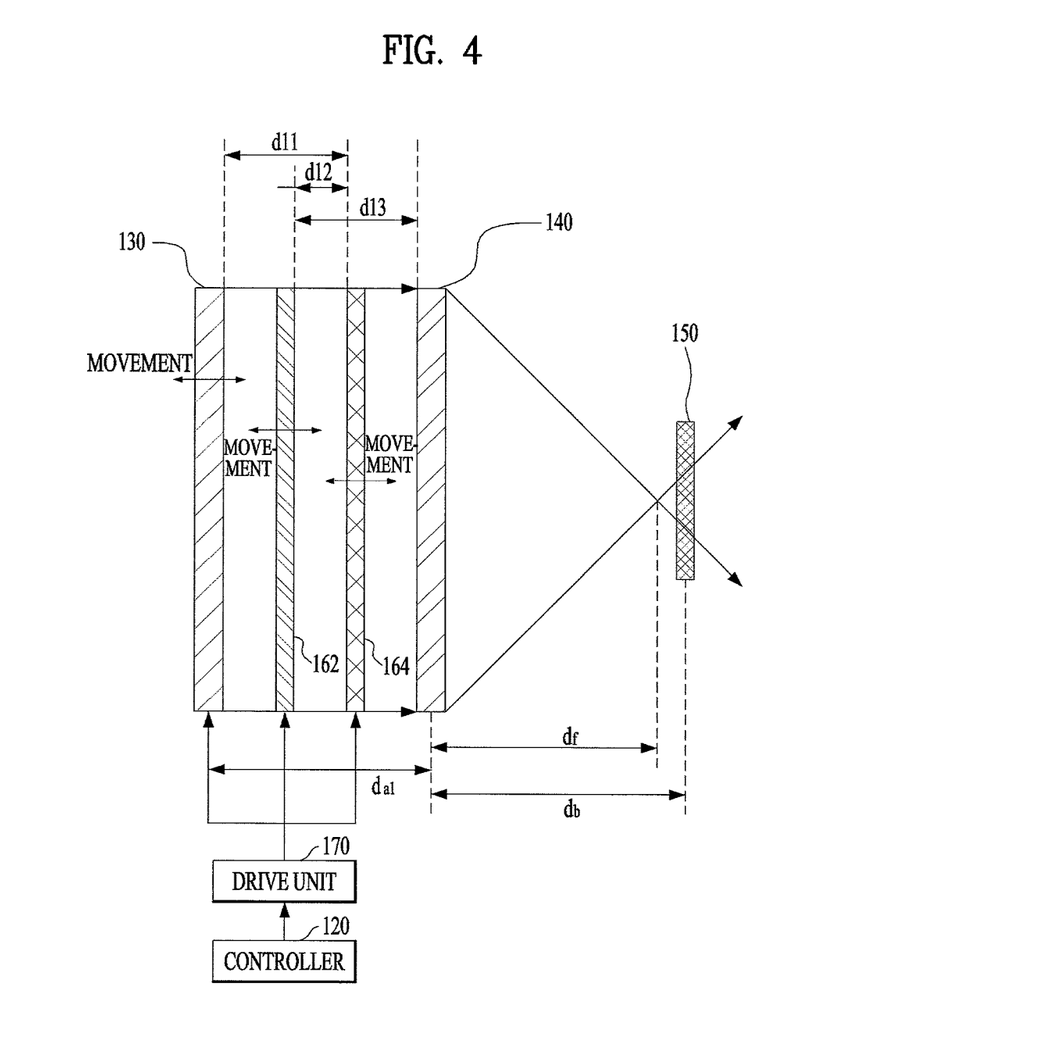
FIGS. 4 to 6 are sectional views schematically illustrating a spatial image projection apparatus according to another embodiment of the present invention.
Figure 5:
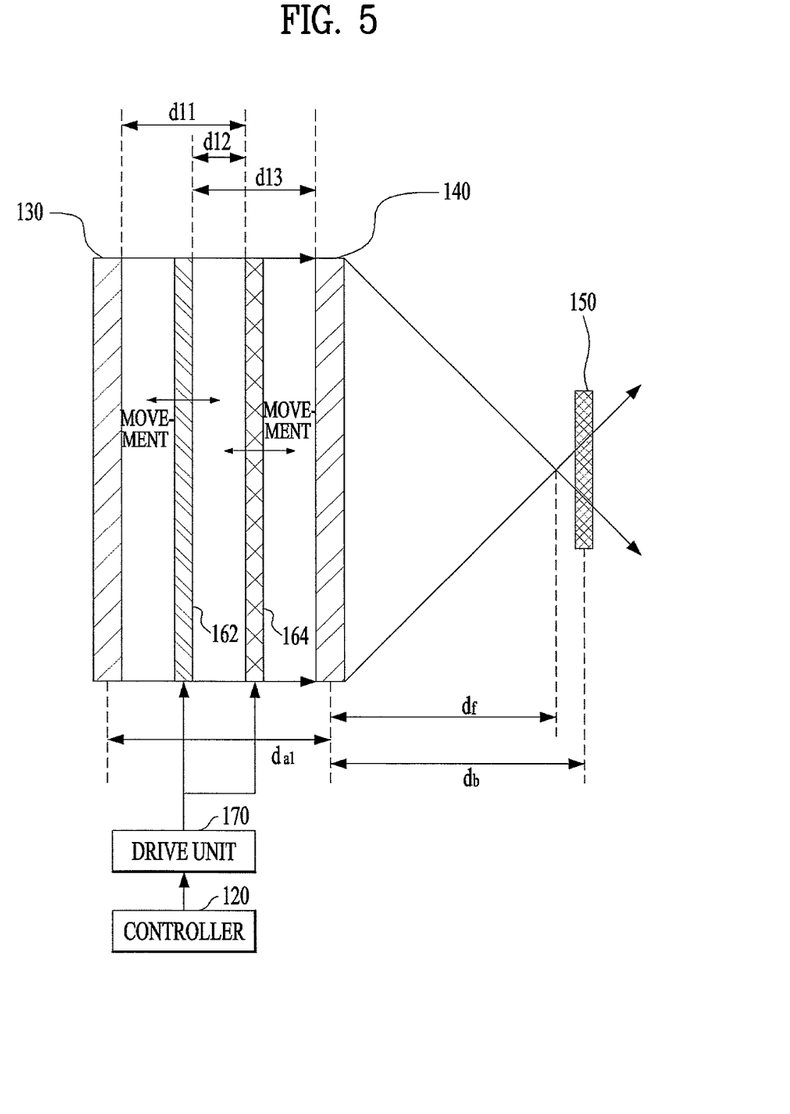
Figure 6:
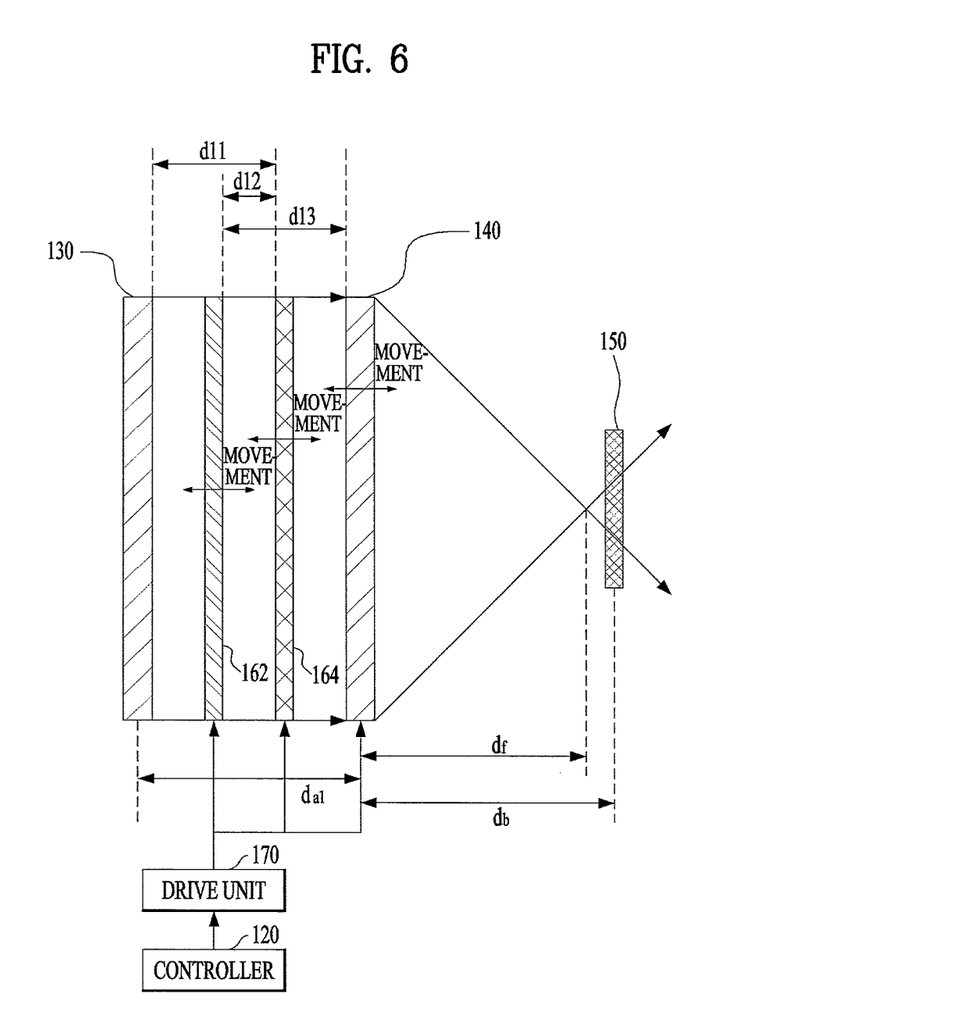

Next, FIGS. 4 to 6 are sectional views schematically illustrating a spatial image projection apparatus according to another embodiment of the present invention. As illustrated in FIGS. 4 to 6, in the spatial image projection apparatus, the display unit 130 and the projection unit 140 are spaced apart from each other by a given distance and the optical-path length-converter 160 is located between the display unit 130 and the projection unit 140.

The optical-path length-converter 160 includes the mirror 162 and the polarizer 164, in order to change the length of the optical path of an image. The polarizer 164 of the optical-path length-converter 160 can transmit specific polarized light, among the light introduced from the display unit 130, to the projection unit 140, and reflects the remaining light, other than the specific polarized light, to the mirror 162.

In addition, the polarizer 164 may include a reflective polarizing plate that transmits only linearly polarized light, without being limited thereto. In addition, the mirror 162 of the optical-path length-converter 160 can transmit light, introduced from the display unit 130, to the polarizer 164, and converts light reflected from the polarizer 164 into specific polarized light so as to again reflect the light to the polarizer 164.

In addition, the mirror 162 may include a one-way mirror that transmits light only in a given direction, without being limited thereto. In some instances, the mirror 162 may further include at least one wavelength plate to convert specific polarized light reflected from the polarizer 164. Further, the polarizer 164 and the mirror 162 are spaced apart from each other by a given distance.

In addition, the polarizer 164 is spaced apart from the display unit 130 by a first distance, and the mirror 162 is spaced apart from the display unit 130 by a second distance. The first distance may be longer than the second distance. That is, the mirror 162 may be located adjacent to the display unit 130, and the polarizer 164 may be located adjacent to the projection unit 140.

In addition, the optical-path length-converter 160 can change the length of the optical path by linearly moving at least one of the mirror 162 and the polarizer 164 toward the display unit 130 or the projection unit 140 in response to a control signal from the controller 120. In some instances, when the optical-path length-converter 160 linearly moves at least one of the mirror 162 and the polarizer 164, at least one of the display unit 130 and the projection unit 140 is linearly moved toward the optical-path length-converter 160 in response to a control signal from the controller 120.

As illustrated in FIG. 4, the mirror 162, the polarizer 164, and the display unit 130 can be moved at the same time by a drive unit 170 in response to a control signal from the controller 120, and the projection unit 140 can be fixed at a prescribed position without movement. In another instance, as illustrated in FIG. 5, the mirror 162 and the polarizer 164 can be moved at the same time by the drive unit 170 in response to a control signal from the controller 120, and the display unit 130 and the projection unit 140 can be fixed at prescribed positions without movement. In a further instance, as illustrated in FIG. 6, the mirror 162, the polarizer 164, and the projection unit 140 can be moved at the same time by the drive unit 170 in response to a control signal from the controller 120, and the display unit 130 can be fixed at a prescribed position without movement.

Accordingly, when a user wants to change the basic distance "da1" between the display unit 130 and the projection unit 140 to a previously stored value, the controller 120 controls the drive unit 170 based on the changed distance "da1". Further, the drive unit 170 can adjust a first optical-path length from the display unit 130 to the polarizer 164, a second optical-path length from the polarizer 164 to the mirror 162, and a third optical-path length from the mirror 162 to the projection unit 140 by moving the mirror 162, the polarizer 164, and the display unit 130 as illustrated in FIG. 4, by moving only the mirror 162 and the polarizer 164 as illustrated in FIG. 5, or by moving only the mirror 162, the polarizer 164, and the projection unit 140 as illustrated in FIG. 6, in response to a control signal from the controller 120.

That is, the respective optical-path length can be changed such that the sum of the distance "d11" between the light emission surface of the display unit 130 and the light reflection surface of the polarizer 164, the distance "d12" between the light reflection surface of the polarizer 164 and the light reflection surface of the mirror 162, and the distance "d13" between the light reflection surface of the mirror 162 and the light introduction surface of the projection unit 140 is equal to the basic distance "da1" between the display unit 130 and the projection unit 140 before the change.

Accordingly, in the present embodiment, even if the basic distance "da1" between the display unit 130 and the projection unit 140 is changed to a shorter distance, the basic distance "da1" between the display unit 130 and the projection unit 140 before the change is maintained as the first optical-path length from the display unit 130 to the polarizer 164, the second optical-path length from the polarizer 164 to the mirror 162, and the third optical-path length from the mirror 162 to the projection unit 140 are adjusted, which ensures that the size of the spatial image 150 is maintained.

In one example, the sum of the distance "d11" between the light emission surface of the display unit 130 and the light reflection surface of the polarizer 164, the distance "d12" between the light reflection surface of the polarizer 164 and the light reflection surface of the mirror 162, and the distance "d13" between the light reflection surface of the mirror 162 and the light introduction surface of the projection unit 140 increases as the distance "da1" between the display unit 130 and the projection unit 140 decreases, and decreases as the distance "da1" between the display unit 130 and the projection unit 140 increases. Accordingly, in the present embodiment, the size of the spatial image projection apparatus is reduced because the size of the spatial image is maintained despite a reduction in the thickness of the apparatus.

Figure 7:
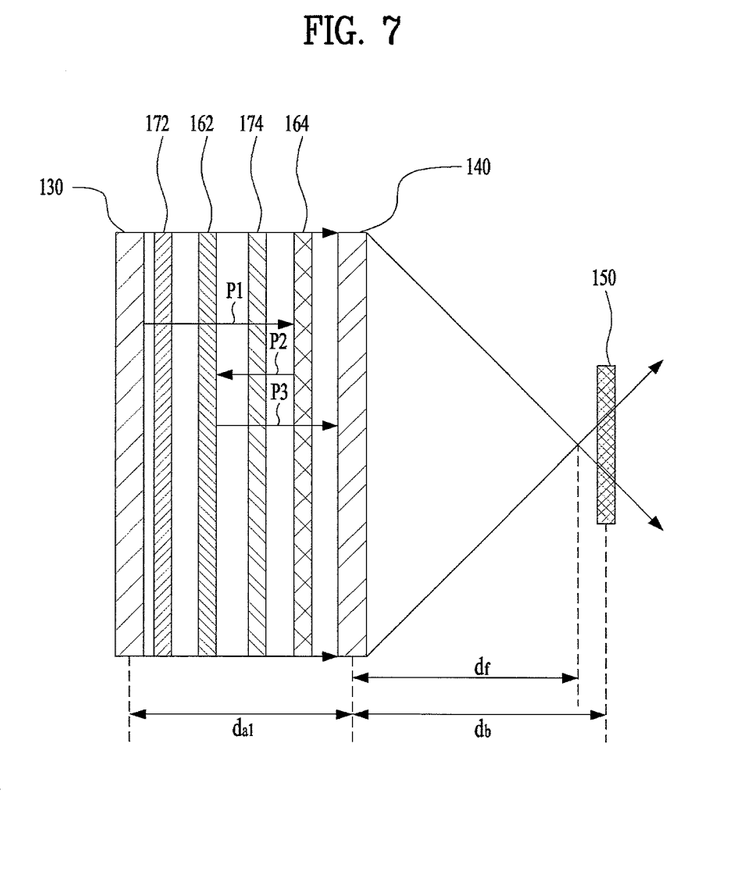
FIG. 7 is a sectional view schematically illustrating a spatial image projection apparatus according to a further embodiment of the present invention.

Next, FIG. 7 is a sectional view schematically illustrating a spatial image projection apparatus according to a further embodiment of the present invention. As illustrated in FIG. 7, in the spatial image projection apparatus, the display unit 130 and the projection unit 140 are spaced apart from each other by a given distance, and the optical-path length-converter 160 is located between the display unit 130 and the projection unit 140.

The optical-path length-converter 160 includes the mirror 162, the polarizer 164, and first and second wavelength plates 172 and 174, in order to change the length of the optical path of an image. The polarizer 164 of the optical-path length-converter 160 transmits specific polarized light, among the light introduced from the display unit 130, to the projection unit 140, and reflects the remaining light, other than the specific polarized light, to the mirror 162.

In addition, the polarizer 164 may include a reflective polarizing plate that transmits only linearly polarized light, without being limited thereto. In addition, the mirror 162 of the optical-path length-converter 160 may transmit light, introduced from the display unit 130, to the polarizer 164, and convert light reflected from the polarizer 164 into specific polarized light so as to again reflect the light to the polarizer 164.

In addition, the mirror 162 may include a one-way mirror that transmits light only in a given direction, without being limited thereto. Also, the polarizer 164 and the mirror 162 are spaced apart from each other by a given distance. In addition, the polarizer 164 is spaced apart from the display unit 130 by a first distance, and the mirror 162 is spaced apart from the display unit 130 by a second distance. The first distance may be longer than the second distance.

That is, the mirror 162 can be located adjacent to the display unit 130, and the polarizer 164 can be located adjacent to the projection unit 140. Further, the first wavelength plate 172 can be located between the display unit 130 and the mirror 162. In addition, the second wavelength plate 174 can be located between the mirror 162 and the polarizer 164.

The first and second wavelength plates 172 and 174 may be the same wavelength plate, and for example, may be a ¼λ wavelength plate. In some instances, the first and second wavelength plates 172 and 174 may be different wavelength plates depending on the specific polarized light that has passed through the polarizer. The reason why the first and second wavelength plates 172 and 174 are arranged is to enhance the brightness of the spatial image 150 projected to the prescribed space by reducing the loss of light.

In addition, the first and second wavelength plates 172 and 174 may have the same area. This serves to prevent the loss of light directed from the mirror 162 to the polarizer 164 and the loss of light directed from the polarizer 164 to the mirror 162. However, in some instances, the first and second wavelength plates 172 and 174 may have different areas.

In one example, the area of the second wavelength plate 174 may be smaller than the area of the first wavelength plate 172. This serves to prevent the loss of light reflected from the polarizer 164, which occurs when the area of the second wavelength plate 174 is larger than the area of the first wavelength plate 172. In addition, the area of at least one of the first and second wavelength plates 172 and 174 may be the same as the area of the display unit 130 and may be the same as the area of the projection unit 140.

In one example, all of the first and second wavelength plates 172 and 174, the polarizer 164, the mirror 162, the display unit 130, and the projection unit 140 have the same area. However, the area of at least one of the first and second wavelength plates 172 and 174 may be different from the area of the display unit 130 or the area of the projection unit 140. In one example, the area of at least one of the first and second wavelength plates 172 and 174 is larger than the area of the display unit 130 or the area of the projection unit 140. This serves to prevent the loss of light emitted from the display unit 130, which occurs when the area of the display unit 130 or the area of the projection unit 140 is larger than the area of the first and second wavelength plates 172 and 174.

When the first and second wavelength plates 172 and 174 are arranged as described above, the polarization of light can be changed based on the optical path. As illustrated in FIG. 7, first, when an image is displayed on the display unit 130, the light corresponding to the image has the characteristics of light polarized in a given direction.

That is, the polarization characteristics of the image in a given direction can be accomplished by an LCD panel, or by adding a polarizing plate to non-polarized light from, for example, OLEDs. In addition, as the light corresponding to the image passes through the first wavelength plate 172, the mirror 162, and the second wavelength plate 174 along the first optical path P1, the direction of polarized light is deviated by about 90 degrees.

Further, the light corresponding to the image is reflected by the polarizer 164 and passes through the second optical path P2. The reflected light is changed to circularly polarized light while passing through the second wavelength plate 174. Also, the changed circularly polarized light is again reflected by the mirror 162 and is changed to linearly polarized light while passing through the second wavelength plate 174 along the third optical path P3. The linearly polarized light passes through the polarizer 164 to thereby be directed to the projection unit 140.

Accordingly, when the first and second wavelength plates 172 and 174 are arranged, the light is directed to the projection unit 140 without the loss of light, and consequently, the brightness of the spatial image 150 projected by the projection unit 140 is enhanced. As such, the optical-path length-converter 160 can change the length of the optical path from the display unit 130 to the projection unit 140 to the sum of the first optical-path length P1 from the display unit 130 to the polarizer 164, the second optical-path length P2 from the polarizer 164 to the mirror 162, and the third optical-path length P3 from the mirror 162 to the projection unit 140.

The first optical-path length P1 is the distance "d11" between the light emission surface of the display unit 130 and the light reflection surface of the polarizer 164, the second optical-path length P2 is the distance "dl 2" between the light reflection surface of the polarizer 164 and the light reflection surface of the mirror 162, and the third optical-path length P3 is the distance "d13" between the light reflection surface of the mirror 162 and the light introduction surface of the projection unit 140. Accordingly, the sum of the first, second, and third optical-path lengths P1+P2+P3 can be changed according to the distance "da1" between the display unit 130 and the projection unit 140.

In one example, the sum of the first, second, and third optical-path lengths P1+P2+P3 increases as the distance "da1" between the display unit 130 and the projection unit 140 decreases, and decreases as the distance "da1" between the display unit 130 and the projection unit 140 increases. That is, when the distance between the display unit 130 and the projection unit 140 is "da1", the focal distance of the projection unit 140 is "df", and the distance between the projection unit 140 and a spatial image 150 is "db", the relationship of 1/db=1/df−1/da can be established.

Accordingly, assuming that the sum of the first, second, and third optical-path lengths P1+P2+P3 is the same as the distance "da1" between the display unit 130 and the projection unit 140, the relationship of P1+P2+P3="da1" can be established. When the distance "da1" between the display unit 130 and the projection unit 140 is reduced, the optical-path length-converter 160 can adjust the sum of the first, second, and third optical-path lengths P1+P2+P3 such that the distance "da1" between the display unit 130 and the projection unit 140 is maintained at the same value as that before the reduction of the distance "da1", which ensures that the size of the spatial image 150 is maintained.

In this way, even if the distance "da1" between the display unit 130 and the projection unit 140 is reduced, the optical-path length-converter 160 maintains the distance "da1" between the display unit 130 and the projection unit 140 at the same value as that before the reduction of the distance "da1" by adjusting the first, second, and third optical-path lengths, thereby enabling the size of the spatial image 150 to be maintained. In addition, when the first and second wavelength plates 172 and 174 are arranged, the light is directed to the projection unit 140 without the loss of light, and consequently, the brightness of the spatial image 150 projected by the projection unit 140 may be enhanced.

Figure 8:
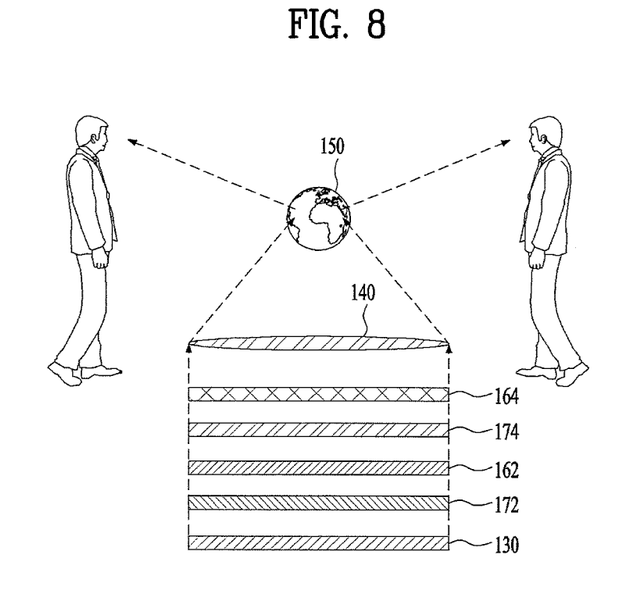
FIG. 8 is a view illustrating a spatial image formed by the spatial image projection apparatus according to an embodiment of the present invention.

Next, FIG. 8 is a view illustrating a spatial image formed by the spatial image projection apparatus according to an embodiment of the present invention. As illustrated in FIG. 8, in the spatial image projection apparatus, the first wavelength plate 172, the mirror 162, the second wavelength plate 174, and the polarizer 164 are sequentially arranged between the display unit 130 and the projection unit 140.

The display unit 130 may be, for example, a general plane display unit, a volumetric 3D display unit using a rotating screen, a stacked 3D display unit, an integrated image based 3D display unit, or a hologram based 3D display unit. In addition, the display unit 130 may include a prescribed polarizing plate so as to polarize and emit light in a given direction when the display unit 130 emits light corresponding to the image.

For example, when an image is displayed on the display unit 130, the image has the characteristics of light polarized in a given direction. The polarization characteristics of the image in a given direction can be accomplished by an LCD panel, or by adding a polarizing plate to non-polarized light from, for example, OLEDs. Then, the projection unit 140 can project a spatial image to a prescribed space by transmitting or reflecting the light corresponding to the image displayed on the display unit 130.

The projection unit 140 may include a single convex lens, or may include an array including a plurality of convex lenses. In addition, the projection unit 140 may include at least one liquid crystal lens or liquid lens. Also, the polarizer 164 can transmit specific polarized light, among the light introduced from the display unit 130, to the projection unit 140, and reflect the remaining light, other than the specific polarized light.

In addition, the mirror 162 can transmit light, introduced from the display unit 130, to the polarizer 164, and again reflect the light reflected from the polarizer 164 to the polarizer 164. The polarizer 164 may include a reflective polarizing plate that transmits only linearly polarized light, and the mirror 162 may include a one-way mirror that transmits light only in a given direction.

Next, a method for producing a spatial image by the spatial image projection apparatus having the above-described configuration will be described. First, when an image is displayed on the display unit 130, the light corresponding to the image has the characteristics of light polarized in a given direction. Then, as the light corresponding to the image passes through the first wavelength plate 172, the mirror 162, and the second wavelength plate 174, the direction of polarized light is deviated by about 90 degrees.

Further, the light, polarized by about 90 degrees, is reflected by the polarizer 164, and the reflected light is changed to circularly polarized light while passing through the second wavelength plate 174. In addition, the changed circularly polarized light is again reflected by the mirror 162 and is changed to linearly polarized light while passing through the second wavelength plate 174. The changed linearly polarized light passes through the polarizer 164 to be directed to the projection unit 140.

Then, the projection unit 140 projects the light to a prescribed space so as to form the spatial image 150. Accordingly, when the first and second wavelength plates 172 and 174 are arranged, the light is directed to the projection unit 140 without the loss of light, and consequently, the brightness of the spatial image 150 projected by the projection unit 140 is enhanced. In addition, in the present embodiment, the size of the spatial image projection apparatus is reduced because the size of the spatial image is maintained despite a reduction in the thickness of the apparatus.

Figure 9:
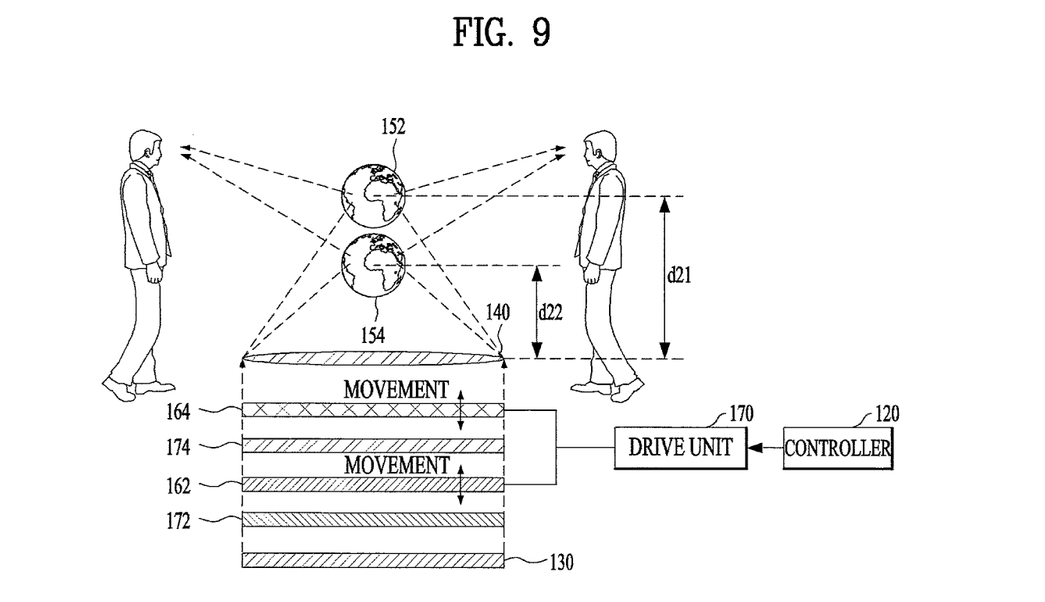
FIG. 9 is a view illustrating variation in the position of a spatial image caused by the movements of a mirror and a polarizer.

Next, FIG. 9 is a view illustrating variation in the position of the spatial image caused by the movements of the mirror and the polarizer. As illustrated in FIG. 9, in the spatial image projection apparatus, the first wavelength plate 172, the mirror 162, the second wavelength plate 174, and the polarizer 164 are sequentially arranged between the display unit 130 and the projection unit 140.

The mirror 162 and the polarizer 164 can be linearly moved by the drive unit 170 as the drive unit 170 is driven in response to a control signal from the controller 120. That is, at least one of the mirror 162 and the polarizer 164 can be linearly moved toward the display unit 130 or the projection unit 140, so as to change the length of the optical path.

In some instances, when at least one of the mirror 162 and the polarizer 164 is linearly moved, at least one of the display unit 130 and the projection unit 140 is also linearly moved in response to a control signal from the controller 120. Accordingly, the basic distance "da1" between the display unit 130 and the projection unit 140 can be adjusted as at least one of the mirror 162 and the polarizer 164 is linearly moved so as to adjust the first optical-path length from the display unit 130 to the polarizer 164, the second optical-path length from the polarizer 164 to the mirror 162, and the third optical-path length from the mirror 162 to the projection unit 140.

In this instance, the position of the spatial image 150 projected by the projection unit 140 can be changed. In one example, when the distance "da1" between the display unit 130 and the projection unit 140 is adjusted to a larger value as the distance "d11" between the light emission surface of the display unit 130 and the light reflection surface of the polarizer 164, the distance "d12" between the light reflection surface of the polarizer 164 and the light reflection surface of the mirror 162, and the distance "dl 3" between the light reflection surface of the mirror 162 and the light introduction surface of the projection unit 140 is adjusted, the spatial image 150 can be projected to a position 154 close to the projection unit 140. When the distance "da1" between the display unit 130 and the projection unit 140 is adjusted to a smaller value, the spatial image 150 can be projected to a position 152 distant from the projection unit 140.

Figure 10:
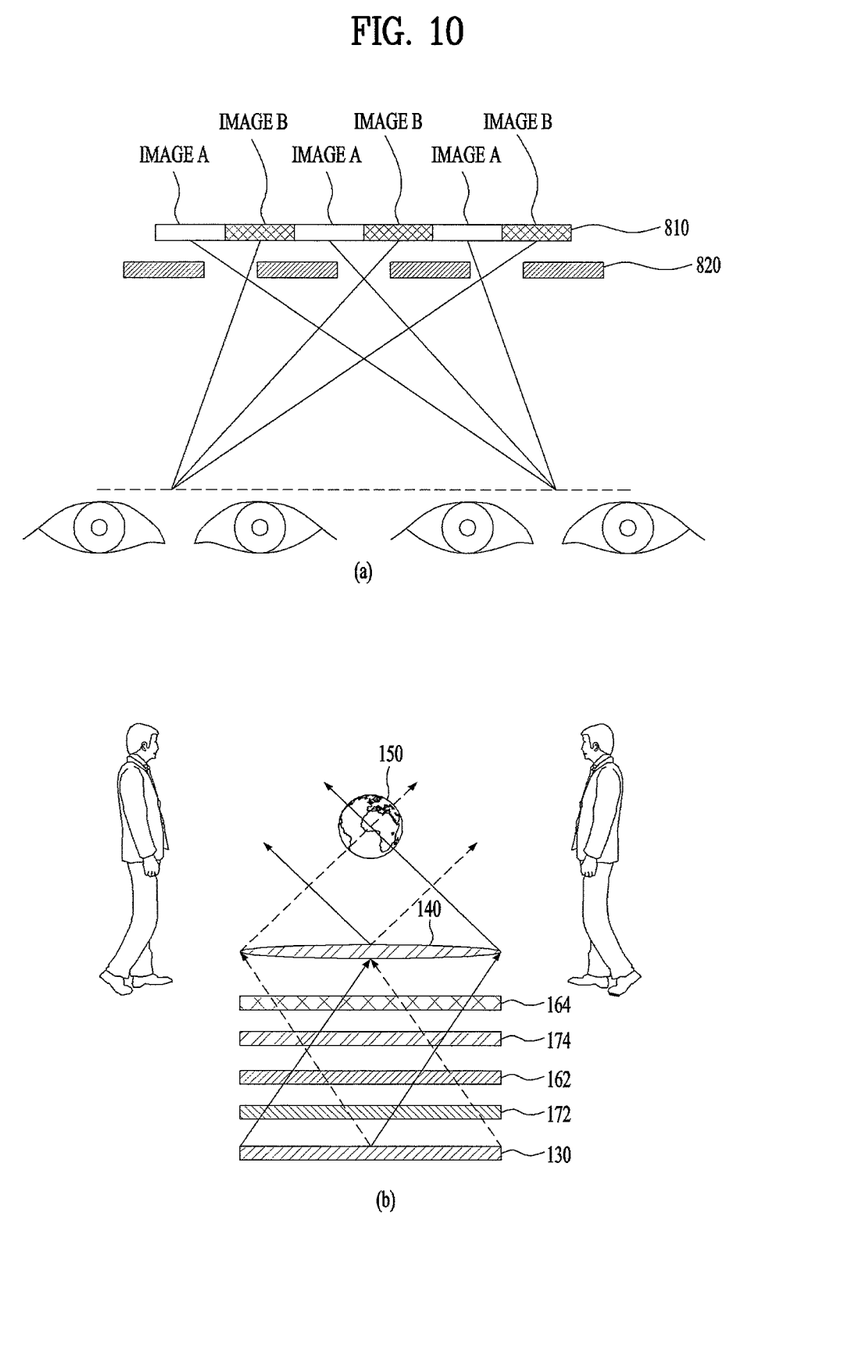
FIG. 10 is a view illustrating a spatial image formed by the spatial image projection apparatus according to another embodiment of the present invention.

Next, FIG. 10 is a view illustrating a spatial image formed by the spatial image projection apparatus according to another embodiment of the present invention. As illustrated in FIG. 10, in the spatial image projection apparatus, the first wavelength plate 172, the mirror 162, the second wavelength plate 174, and the polarizer 164 are sequentially arranged between the display unit 130 and the projection unit 140.

The display unit 130 may be, for example, a general plane display unit, a volumetric 3D display unit using a rotating screen, a stacked 3D display unit, an integrated image based 3D display unit, or a hologram based 3D display unit. In addition, the display unit 130 may include a prescribed polarizing plate so as to polarize and emit light in a given direction when the display unit 130 emits light corresponding to the image.

For example, when an image is displayed on the display unit 130, the image has the characteristics of light polarized in a given direction. The polarization characteristics of the image in a given direction may be accomplished by an LCD panel, or by adding a polarizing plate to non-polarized light from, for example, OLEDs. Then, the projection unit 140 can project a spatial image to a prescribed space by transmitting or reflecting the light corresponding to the image displayed on the display unit 130.

The projection unit 140 may include a single convex lens, or may include an array including a plurality of convex lenses. In addition, the projection unit 140 may include at least one liquid crystal lens or liquid lens. Next, the polarizer 164 may transmit specific polarized light, among the light introduced from the display unit 130, to the projection unit 140, and reflect the remaining light, other than the specific polarized light.

In addition, the mirror 162 can transmit light, introduced from the display unit 130, to the polarizer 164, and again reflect the light reflected from the polarizer 164 to the polarizer 164. The polarizer 164 may include a reflective polarizing plate that transmits only linearly polarized light, and the mirror 162 may include a one-way mirror that transmits light only in a given direction. In addition, as illustrated in FIG. 10(a), the display unit 130 includes a light emitting unit 810 and a parallax barrier 820.

The light emitting unit 810 serves to display a received image and to emit light corresponding to the image. The light emitting unit 810 may include elements such as, for example, LCD elements, which are capable of emitting light based on the value of respective pixels included in a spatial image. Further, the parallax barrier 820 may be a shield film in which light shielding regions and light transmissive regions are arranged in a lattice pattern.

The parallax barrier 820 may be located at the front surface of the light emitting unit 810. In addition, when the image, received by the light emitting unit 810, is an image in which pixels corresponding to two images are alternately arranged, the light corresponding to the image emitted from the light emitting unit 810 may be projected in different directions on a per image basis.

For example, when the light emitting unit 810 displays an image, in which pixels of an image A and pixels of an image B are alternately arranged, and emits light corresponding to the image, the parallax barrier 820 causes the light of the pixels corresponding to the image A to be projected in the direction C while shielding the light so as not to be projected in other directions.

In addition, the parallax barrier 820 causes the light of the pixels corresponding to the image B to be projected in the direction D while shielding the light so as not to be projected in other directions. Accordingly, the image A having passed through the parallax barrier 820 can be projected only in the direction C, and the image B can be projected only in the direction D.

As illustrated in FIG. 10(b), a user who is located in the direction C can perceive only the image A, and a user who is located in the direction D can perceive only the image B. As described above, the present invention may enable users who are located at different positions to perceive different images.

Although FIGS. 10(a) and 10(b) illustrate images projected in two directions, the display unit 130, which includes the parallax barrier in which the light shielding regions and the light transmissive regions are formed in a lattice pattern, can according to the image realization method, change the image projected to a space so as to allow users who are located in four directions to perceive different images.

Figure 11:
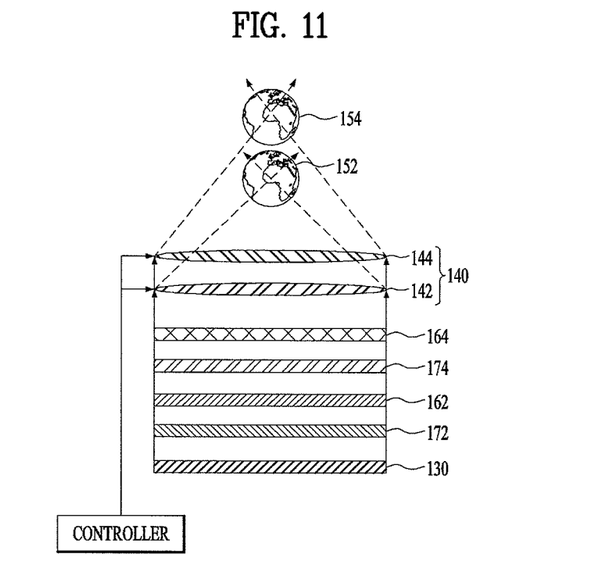
FIG. 11 is a view illustrating a spatial image formed by the spatial image projection apparatus according to still another embodiment of the present invention.

Next, FIG. 11 is a view illustrating a spatial image formed by the spatial image projection apparatus according to still another embodiment of the present invention. As illustrated in FIG. 11, in the spatial image projection apparatus, the first wavelength plate 172, the mirror 162, the second wavelength plate 174, and the polarizer 164 are sequentially arranged between the display unit 130 and the projection unit 140.

The projection unit 140 may include a plurality of lenses. In one example, the projection unit 140 may include a plurality of liquid crystal lenses or liquid lenses. The liquid crystal lens or the liquid lens may be changed, according to the control of the controller, to when the lenses refract light (hereinafter referred to as an operating state), or when the lenses do not refract light (hereinafter referred to as a non-operating state).

For example, the projection unit 140 includes a second lens 144 in the form of a liquid crystal lens or liquid lens, which is located in front of the polarizer 164 of the optical-path length-converter 160, and a first lens 142 located between the second lens 144 and the polarizer 164. In addition, the controller receives a projection position signal from the receiver, so as to project a spatial image to the second position 154.

Then, in order to project the spatial image to the second position 154 which is distant from the polarizer 164 in response to the projection position signal, the controller changes the first lens 142 to the non-operating state, and changes the second lens 144 to the operating state. In addition, the controller receives a projection position signal from the receiver, so as to project a spatial image to the first position 152.

Then, in order to project the spatial image to the first position 152 which is close to the polarizer 164 in response to the projection position signal, the controller changes the second lens 144 to the non-operating state, and changes the first lens 142 to the operating state. Accordingly, the spatial image projection apparatus of the present embodiment can change the position, at which the spatial image is projected, based on the projection position signal as illustrated in FIG. 11.

Figure 12:
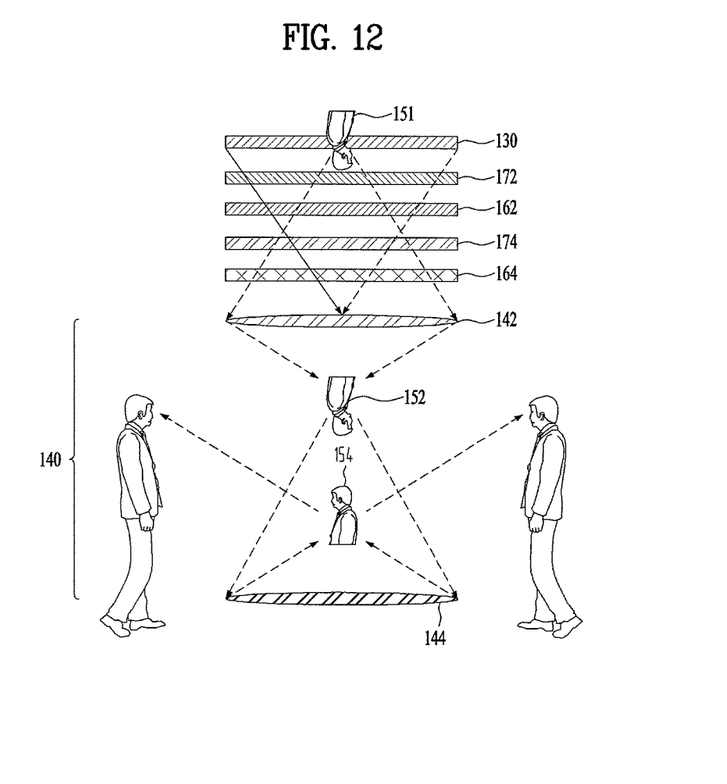
FIG. 12 is a view illustrating a spatial image formed by the spatial image projection apparatus according to a further embodiment of the present invention.

Next, FIG. 12 is a view illustrating a spatial image formed by the spatial image projection apparatus according to a further embodiment of the present invention. As illustrated in FIG. 12, in the spatial image projection apparatus, the first wavelength plate 172, the mirror 162, the second wavelength plate 174, and the polarizer 164 are sequentially arranged between the display unit 130 and the projection unit 140.

The projection unit 140 may include a plurality of lenses. In one example, the projection unit 140 includes the first lens 142 which transmits light introduced from the optical-path length-converter 160 so as to project a first spatial image to the first position 152, and the second lens 144 which is spaced apart from the first lens 142 by a given distance and reflects the light directed from the first lens 142 so as to project a second spatial image to the second position 154.

The first lens 142 may be a floating lens, and the second lens 144 may be a floor lens. In this instance, the first spatial image and the second spatial image may be symmetrically projected. In addition, the first spatial image, projected to the first position 152, can be the same as the image displayed on the display unit 130. Accordingly, the user may perceive, in all directions, the second spatial image, which is projected to a space corresponding to the second position located between the first lens 142 and the second lens 144.

As is apparent from the above description, according to one embodiment of the present invention, as a result of locating an optical-path length-converter between a display unit and a projection unit, the thickness of a spatial image projection apparatus is reduced and a spatial image that has the same size as an image displayed on the display unit is maintained. In addition, by minimizing the depth of the spatial image projection apparatus, the size of a mechanism capable of forming a spatial image is reduced.

Although the exemplary embodiments have been illustrated and described as above, of course, it will be apparent to those skilled in the art that the embodiments are provided to assist understanding of the present invention and the present invention is not limited to the above described particular embodiments, and various modifications and variations can be made in the present invention without departing from the spirit or scope of the present invention, and the modifications and variations should not be understood individually from the viewpoint or scope of the present invention.

What is claimed is:

1. A spatial image projection apparatus, comprising:
a receiver configured to receive an image signal;
a display unit configured to display an image acquired by processing the image signal;
a controller to control the display unit;
a projection unit configured to project a spatial image to a prescribed space by transmitting or reflecting light corresponding to the image displayed on the display unit; and
an optical-path length-converter located between the display unit and the projection unit so as to change an optical-path length of the image,
wherein the optical-path length-converter includes:
a polarizer configured to transmit only specific polarized light, among the light introduced from the display unit, toward the projection unit, and to reflect the remaining light other than the specific polarized light; and
a mirror configured to transmit light, introduced from the display unit, to the polarizer, and to convert the light reflected from the polarizer into specific polarized light so as to again reflect the light to the polarizer,
wherein the optical-path length-converter changes an optical-path length from the display unit to the projection unit by linearly moving the mirror and the polarizer toward the display unit or the projection unit in response to a control signal from the controller so as to reduce a distance between the display unit and the projection unit and such that a size of the spatial image is maintained.

2. The apparatus according to claim 1, wherein the polarizer includes a reflective polarizing plate configured to transmit only linearly polarized light.

3. The apparatus according to claim 1, wherein the mirror includes a one-way mirror configured to transmit light only in a given direction.

4. The apparatus according to claim 1, wherein the polarizer and the mirror are spaced apart from each other by a given distance.

5. The apparatus according to claim 1, wherein the polarizer is spaced apart from the display unit by a first distance,
wherein the mirror is spaced apart from the display unit by a second distance, and
wherein the first distance is longer than the second distance.

6. The apparatus according to claim 1, wherein the polarizer and the mirror have the same area.

7. The apparatus according to claim 1, wherein at least one of the polarizer and the mirror has the same area as an area of the display unit.

8. The apparatus according to claim 1, wherein the optical-path length-converter is configured to change the optical-path length from the display unit to the projection unit to the sum of a first optical-path length from the display unit to the polarizer, a second optical-path length from the polarizer to the mirror, and a third optical-path length from the mirror to the projection unit.

9. The apparatus according to claim 8, wherein the first optical-path length is a distance between a light emission surface of the display unit and a light reflection surface of the polarizer,
wherein the second optical-path length is a distance between the light reflection surface of the polarizer and a light reflection surface of the mirror, and
wherein the third optical-path length is a distance between the light reflection surface of the mirror and a light introduction surface of the projection unit.

10. The apparatus according to claim 8, wherein the sum of the first, second, and third optical-path lengths is changed according to a distance between the display unit and the projection unit.

11. The apparatus according to claim 10, wherein the sum of the first, second, and third optical-path lengths increases as the distance between the display unit and the projection unit decreases, and decreases as the distance between the display unit and the projection unit increases.

12. The apparatus according to claim 1, wherein, when optical-path length-converter linearly moves the mirror and the polarizer, at least one of the display unit and the projection unit is linearly moved toward the optical-path length-converter in response to the control signal from the controller.

13. The apparatus according to claim 1, wherein the optical-path length-converter includes:

a first wavelength plate located between the display unit and the mirror; and a second wavelength plate located between the mirror and the polarizer.

14. The apparatus according to claim 13, wherein the first and second wavelength plates are ¼λ wavelength plates.

15. The apparatus according to claim 13, wherein the first wavelength plate and the second wavelength plate have the same area.

16. The apparatus according to claim 13, wherein the area of the first and second wavelength plates is the same as an area of the display unit.

17. The apparatus according to claim 1, wherein the display unit is configured to polarize and emit light in a given direction when emitting the light corresponding to the image.

18. The apparatus according to claim 1, wherein the projection unit includes a single convex lens, or an array including a plurality of convex lenses.

19. The apparatus according to claim 1, wherein the projection unit includes:
- a first lens configured to transmit light introduced from the optical-path length-converter so as to project a first spatial image to a first space; and
- a second lens spaced apart from the first lens by a given distance, the second lens being configured to reflect the light directed from the first lens so as to project a second spatial image to a second space.

* * * * *